Dec. 29, 1959     A. D. CULPEPPER     2,919,013
EXTENSIBLE CONVEYOR

Filed March 19, 1957     4 Sheets-Sheet 1

Albert D. Culpepper
INVENTOR.

Dec. 29, 1959    A. D. CULPEPPER    2,919,013
EXTENSIBLE CONVEYOR

Filed March 19, 1957    4 Sheets-Sheet 2

Albert D. Culpepper
INVENTOR.

BY *Clarence A. O'Brien*
*and Harvey B. Jacobson*
Attorneys

Dec. 29, 1959  A. D. CULPEPPER  2,919,013
EXTENSIBLE CONVEYOR
Filed March 19, 1957  4 Sheets-Sheet 3
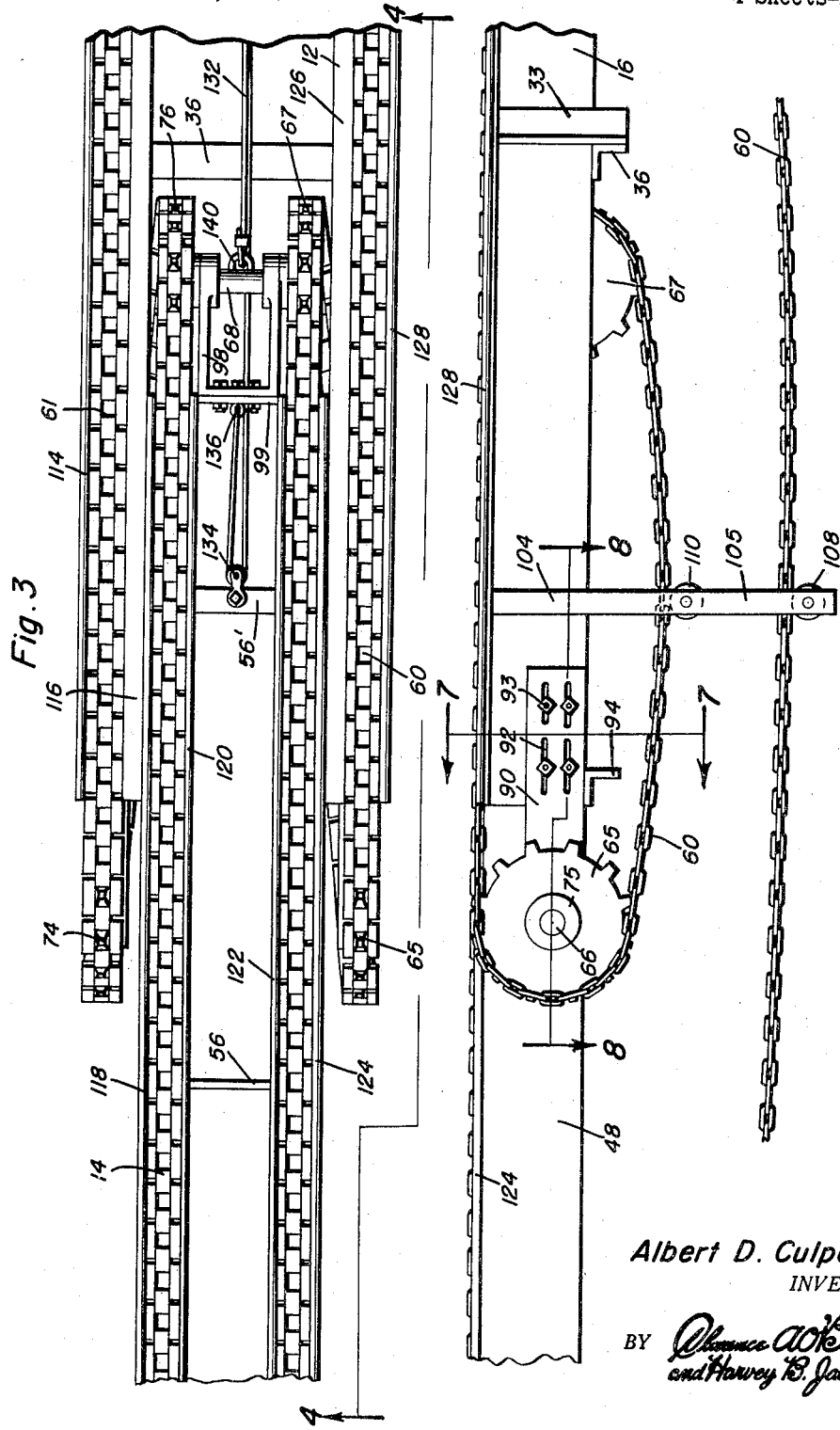
Albert D. Culpepper
INVENTOR.

Dec. 29, 1959
A. D. CULPEPPER
2,919,013
EXTENSIBLE CONVEYOR
Filed March 19, 1957
4 Sheets-Sheet 4
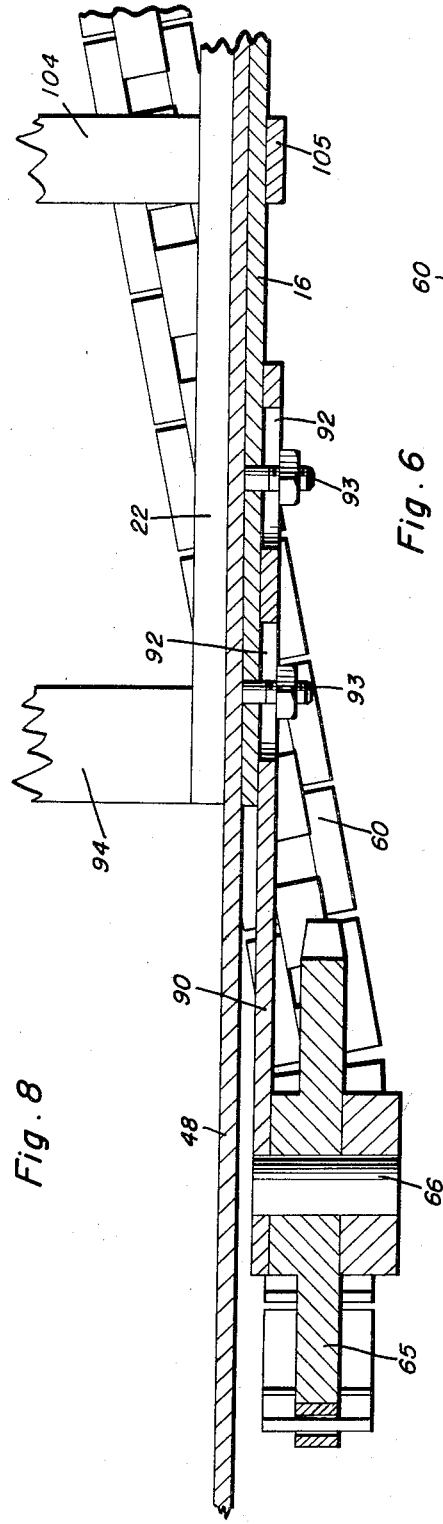
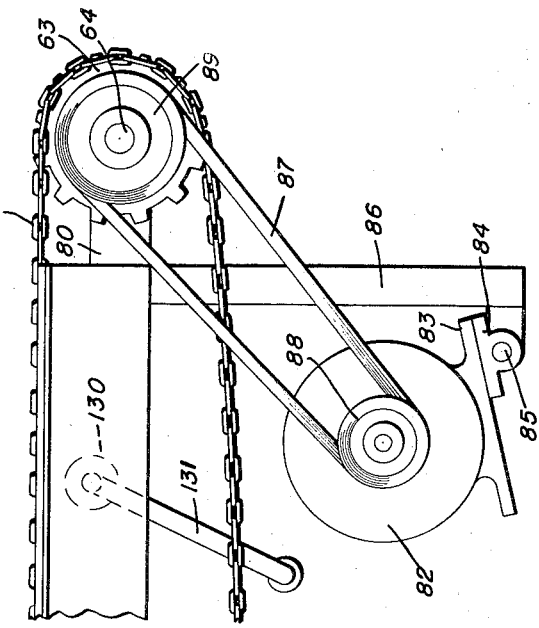
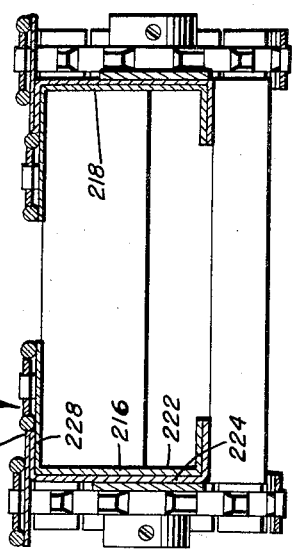
Albert D. Culpepper
INVENTOR.

United States Patent Office 2,919,013
Patented Dec. 29, 1959

2,919,013

EXTENSIBLE CONVEYOR

Albert D. Culpepper, Perry, Ga., assignor of one-half to Paschal Muse, Perry, Ga.

Application March 19, 1957, Serial No. 647,006

6 Claims. (Cl. 198—139)

This invention relates to an extensible conveyor and more particularly to a portable, extensible conveyor.

In loading and unloading a truck or any other vehicle, an extensible conveyor which is constructed in accordance with the invention may be shortened or lengthened so that the truck will not have to be moved forward or backward as it is loaded or unloaded. Moreover, there are many uses in addition to this for a practical extensible conveyor. One such use is in connection with other conveyors in warehouses so they can be extended or retracted as the space is varied in proportion to the loading or unloading. Accordingly, it is a principal object of the invention to provide an improved extensible conveyor to serve these purposes and numerous others as will become apparent to those who work in various professions and trades and particularly those whose principal or ancillary duties require the handling of loads.

There have been extensible conveyors used in the past. However, all those of which I am aware fail to provide a practical construction in that there is either a complicated chain arrangement or complete independence of conveyor chains in the forward and rear sections, thereby creating a timing and synchronization problem which can be solved only by additional mechanisms which my invention finds wholly and totally unnecessary.

Therefore, it is a further object of the invention to provide a structurally improved, extensible conveyor that is constructed of two sections that are extensibly associated with each other and that have two chains interconnected with both of the sections.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a fragmentary top plan view of the extensible conveyor of Figure 1 on an enlarged scale, showing the parts thereof where the two sections are interconnected;

Figure 4 is an elevational side view of the conveyor part of Figure 3;

Figure 6 is a fragmentary elevational view showing a power drive for the endless conveyor;

Figure 7 is an enlarged, transverse sectional view taken on the line 7—7 of Figure 4;

Figure 8 is an enlarged sectional view taken on the line 8—8 of Figure 4; and

Figure 9 is a transverse sectional view of a modification of the conveyor, the differences in construction being in the manner of building up the side rails.

Figure 1:
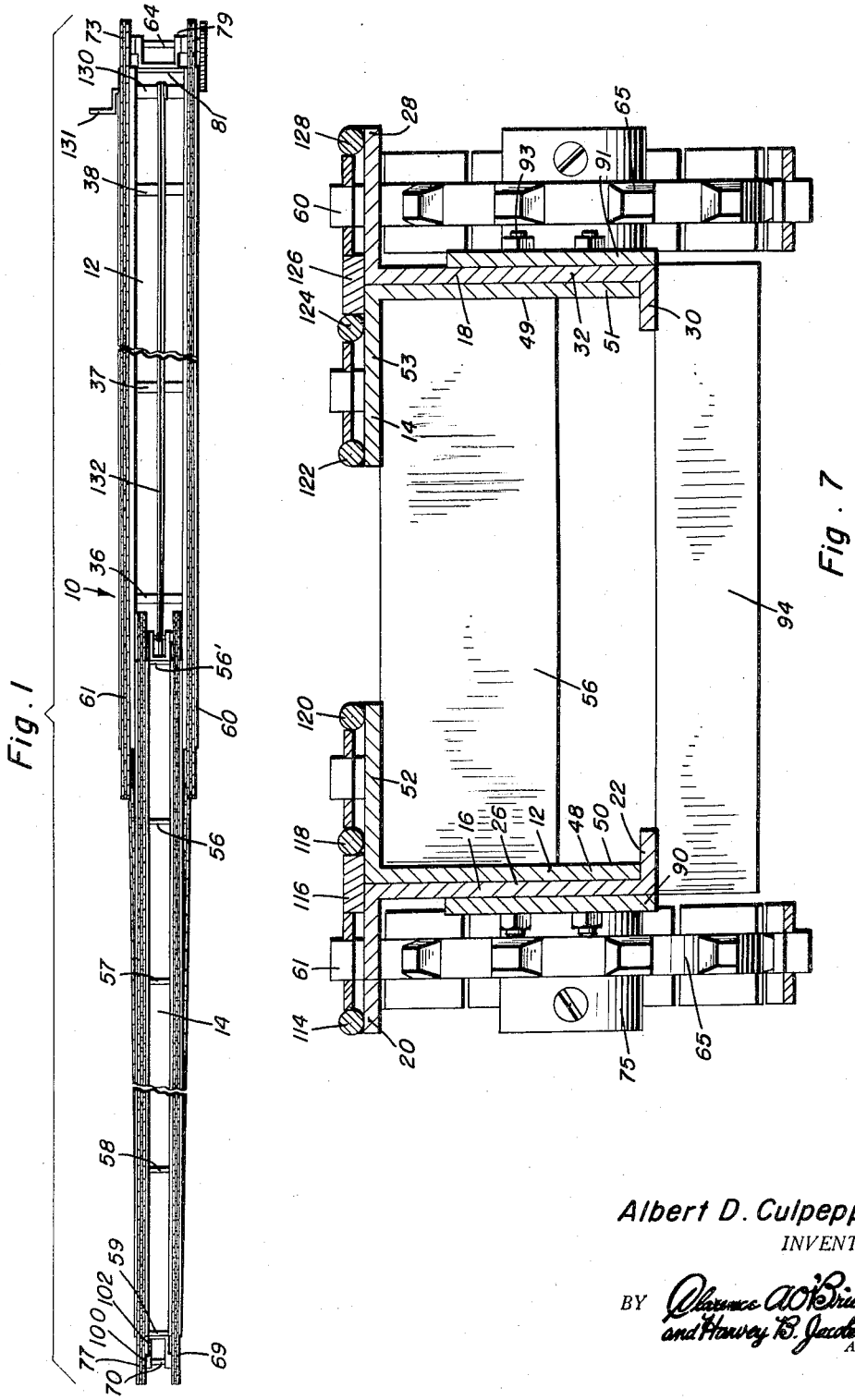
Figure 1 is a top view in small scale of an extensible conveyor which is constructed in accordance with the principles of the invention.
Figure 2:
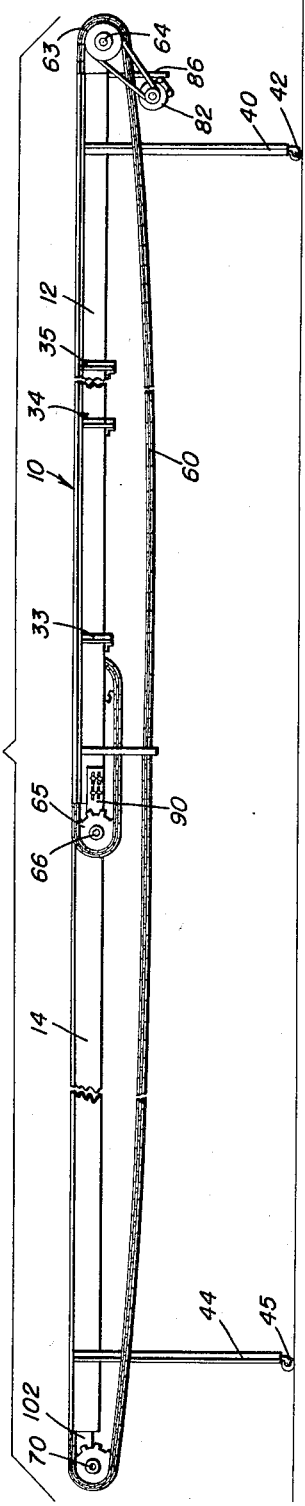
Figure 2 is a side view of the conveyor of Figure 1.

In the accompanying drawings there is an extensible conveyor 10 which is constructed to illustrate the principles of the invention. This conveyor is made of two sections 12 and 14, respectively, that are extensibly connected together. Section 12 is the larger, outer section within which the smaller section 14 is slidable. Section 12 is constructed of two side rails 16 and 18, respectively, which are of Z section (Figure 7). Therefore, rail 16 has an upper horizontal flange 20 and a lower horizontal flange 22 parallel to flange 20 and connected by the vertical side 26 of rail 16. Rail 18 has an upper flange 28 and a lower flange 30, the flanges being connected together and held parallel by means of side 32 of rail 18. Small angle-iron braces in pairs, for example, pairs 33, 34, 35 of Figure 2, are on the outside surfaces of the sides of the rails 16 and 18 and extend below the bottom flanges 22 and 30. A transverse brace extends across and is secured to the lower ends of the braces of the pairs 33, 34 and 35. For these pairs there will be braces 36, 37 and 38, thereby forming a rigidly constructed section 12. A pair of vertical legs 40 are welded to the outside surfaces of the sides of rails 16 and 18 and have casters 42 at the lower ends thereof. These legs coact with the legs 44 having casters 45 (Figure 2) to form the support for the entire conveyor. Legs 44 are on extensible section 14.

Section 14 has sides made of angles, the sides of rails 48 and 49 having side walls 50 and 51 and upper inwardly directed flanges 52 and 53 which are coplanar with flanges 20 and 28. The lower edges of the side walls 50 and 51 rest on the top surfaces of the flanges 22 and 30. Transverse braces 56, 57 and 58 are welded to the inside surfaces of the sides of rails 48 and 49, thereby rigidifying the structure of the section 14.

There are two chains 60 and 61 and each is operatively connected to the two sections 12 and 14 in order to form the movable support on which articles are to be placed when they are conveyed by the extensible conveyor. Chain 60 extends around a sprocket 63 on transverse shaft 64 at one end of the extensible conveyor and then extends around sprocket 65 which is carried by spindle 66 at the forward end of the side of section 12. Then the chain 60 extends around a sprocket 67 which is mounted for rotation on a shaft disposed in sleeve 68 (Figure 5) on the section 14. Thereafter, the chain 60 again proceeds in the same general directions as originally described and extends around sprocket 69 mounted for rotation on a transverse shaft 70. This shaft is supported at the extremity of section 14 that is farthest from the opposite end of section 12.

Figure 5:
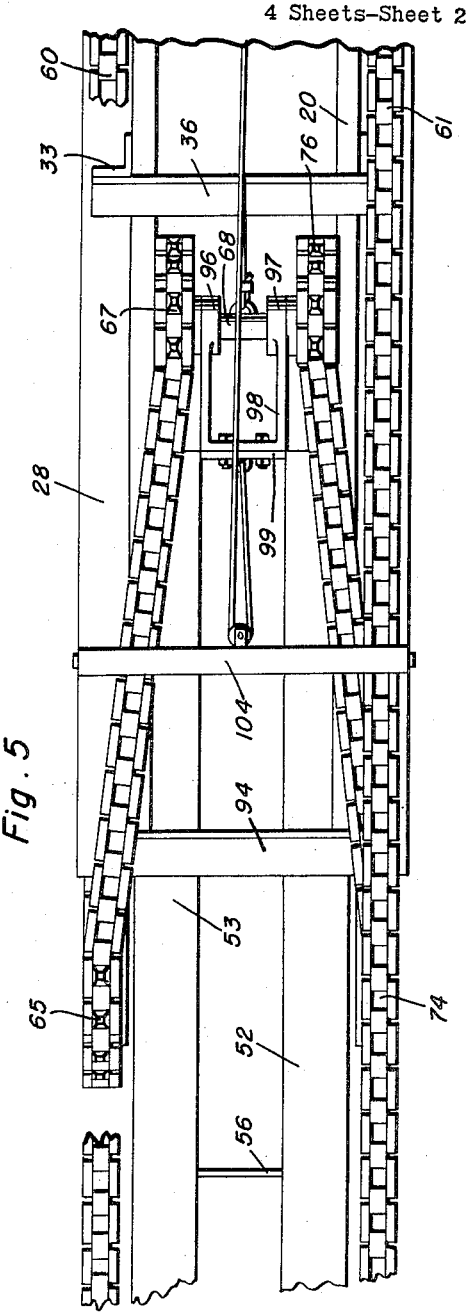
Figure 5 is a bottom plan view of the part of the conveyor shown in Figure 3.

Chain 61 is mounted identically on sprockets which are mounted on the same shafts as their corresponding sprockets for the chain 60. Chain 61 is entrained around sprocket 73 on shaft 64 and extends over a sprocket 74 that is mounted for rotation on a small spindle and held captive thereon by collar 75. Then chain 61 is doubled back and entrained around sprocket 76 on the end of the shaft in sleeve 68 which supports sprocket 67 (Figure 5). Chain 61 then extends forwardly and is entrained around terminal sprocket 77 on shaft 70, after which it returns under sprocket 73, making the chain endless.

Shaft 64 is mounted in bearings 79 at the ends of a generally U-shaped, rearwardly opening frame 80 which is welded or otherwise secured to a transverse member 81 of section 12. Although any source of power may be used to drive the conveyors, electric motor 82 is shown.

This motor has a base 83 mounted on a bearing 84. The bearing is oscillatably disposed on transverse spindle 85, the latter being fixed to vertical hangers 86 at the end of the rails of section 12. In addition, any type of power transmission may be used, belt 87 on pulleys 88 and 89 being illustrated (Figure 6). The pulleys are attached to the motor shaft and to shaft 64, respectively. Sprockets 63 and 73 are attached to shaft 64 so that when motor 82 is energized, the conveyor chains are actuated. The spindles which support sprockets 65 and 74, respectively, are carried by adjustable carriage plates 90 and 91, each being formed with a plurality of slots 92 through which bolts of the bolt and nut assemblies 93 pass. The bolts are attached to the sides 26 and 32 of rails 16 and 18. In this way, the spindles that support sprockets 65 and 74 are capable of being moved longitudinally of the conveyor section 12, thereby adjusting the tension of the chains 60 and 61. For additional strength of construction, a transverse brace 94, which is the same in construction as braces 34, 35 and 36, is welded at the end of the pair of rails 16 and 18 immediately below the carriage plates 90 and 91.

Sprockets 67 and 76 are on a common shaft, mounted for rotation in sleeve 68 (Figure 5) and carried by bearings 96 and 97 at the ends of the approximately U-shaped frame 98. This frame is bolted to a transverse brace 99 between the sides of section 14. As shown in Figure 5, the sprockets 67 and 76 are set in, enabling the chains 60 and 61 to be brought in without interfering with each other in order to be engaged over the section 14 in the manner described previously.

Sprockets 69 and 77 are carried on the common shaft 70. This is mounted for rotation in bearings 100 that are at the end of U-shaped frame 102 carried at the end of a transverse brace 59.

A chain support 104 having sides 105 attached to the outside surfaces of the rails of section 12 is adapted to support both chains and more particularly two flights of both chains (Figure 4). The lowermost flight of each chain is supported by a pair of rollers 108, the latter being mounted on sides 105 of chain support 104. The upper flights of the two chains are supported on a pair of rollers 110, these also being carried by the sides 105 of chain support 104. By virtue of this construction, the chains are not separated too far from the sections 12 and 14 regardless of maladjustment of the chains.

The chains have their uppermost flights held captive when they work on and move over the upper surfaces of flange 20, 52 and 53, 58. For chain 61 there is an outer longitudinal guide 114 along the outer edge of flange 20 and tack welded in place. Guide 114 is made of cylindrical stock, although this may be altered. Plate guide 116 has a surface parallel to the guide 114 and is sufficiently wide to overlie a part of flange 52. Therefore, guide 116 serves the second function of holding the sections extensibly interconnected with each other. Parallel guides 118 and 120 are welded to the top surface of flange 64 and these also have the uppermost flight of chains 61 captive therein. The same arrangement of guides is provided for the chain 60. There are guides 122, 124 for the inner part of the uppermost flight of this chain, and the flat plate guide 126 which is the counterpart of guide 116, together with guide rod 128, which forms with a surface of flat plate guide 126 the guide on the flange 28.

A shaft 130 is mounted for rotation in bearings in the rails 16 and 18 and it has a handle 131 at one end. A cable or rope 132 is attached to the shaft 130. This shaft functions as a winding drum to which an intermediate part of cable 132 is attached and wrapped around a few times. One end of cable 132 extends around an idler pulley 134 on transverse brace 56' at one end of section 12. This reverses the direction of the cable 132 and the extremity is attached to eye 136 on the transverse brace 99 to which frame 98 is secured. The other end of the cable 132 is attached to an eye 140 and this is welded or otherwise attached to the sleeve 68 that is carried by frame 98. Therefore, the sections 12 and 14 are pulled together or spread apart in response to rotation of handle 131.

Attention is now invited to Figure 9 where a modification of the invention is illustrated. This modification is precisely the same in construction, function and operation as the previously described extensible conveyor, with the exception that the rails 216 and 218 have been fabricated of a lighter weight material. Extensible conveyor 220 of Figure 9 is lighter, but exceedingly strong. Rail 216 is built up of channel 222 that is nested within channel 224, with the channel 224 having its upper flange 228 provided with a return bend, as at 230. The two pairs of chain guides then are seated on the upper surface of rail 216. Rail 218 is constructed in an identical manner. All other structure is the same as that described in connection with the other illustrated embodiment of the invention.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In an extensible conveyor, the combination of a first and a second section, said sections having sides with upper flanges that are coplanar to establish two parallel portions on each side of the conveyor, an endless chain for each side of said pair of sections, sprockets at the outer extremities of said sections around which said endless chain is entrained, an intermediate part of said endless chain being on one of said pairs of said parallel portions and in two coplanar flights, a first and second pair of sprockets at the ends of said sections around which the intermediate part of said endless chain is entrained, one sprocket of said pair being inset with respect to the other sprocket of said pair to enable the chain to cross over, and means operatively connected each of said sections for moving said sections with respect to each other.

2. The endless conveyor of claim 1 wherein at least one of said sprockets is mounted on a spindle, a carriage plate supporting said spindle, and means adjustably attaching said carriage plate to one of said sections and thereby mounting said carriage plate for adjustment.

3. The endless conveyor of claim 2 wherein one of said sections has two rails of Z-shaped configuration in cross section and the other of said sections has angular shaped sides fitted in said Z-shaped rails and resting on the lower flanges thereof.

4. An extensible conveyor comprising in combination, first and second elongated conveyor sections having outer ends and slidably telescoped inner end portions, a pair of spaced parallel chain tracks extending longitudinally on each of said sections, the tracks on one section being closer together than the tracks on the other section and disposed therebetween in coplanar relation therewith, inner and outer pairs of sprockets provided at the respective inner and outer ends of the chain tracks on each section, and a pair of endless chains passing from the outer to the inner pair of sprockets on the first section through the tracks thereon and crossing from the inner pair of sprockets of the first section to the inner pair of sprockets of the second section and passing from the inner to the outer pair of sprockets on the second section through the tracks thereon and then extending between the outer pairs of sprockets of the two sections to complete their endless continuity.

5. The device as defined in claim 4 together with means independent of said chains for extending and contracting said conveyor sections.

6. The device as defined in claim 5 wherein said means comprise a rotatable shaft provided at the outer end of the first conveyor section, a pulley provided at the inner end of the first section, and a cable having an intermediate portion thereof wound around said shaft, said cable passing around said pulley and having both its ends anchored to the inner end of the second conveyor section.

References Cited in the file of this patent

UNITED STATES PATENTS

| | | |
|---|---|---|
| 782,050 | Plunket | Feb. 7, 1905 |
| 2,491,255 | Edwards | Dec. 13, 1949 |
| 2,768,732 | Muhlenbruch | Oct. 30, 1956 |